United States Patent [19]

Giles

[11] Patent Number: 5,704,955

[45] Date of Patent: Jan. 6, 1998

[54] AIR FILTRATION SYSTEM FOR VENTED EXHAUST SYSTEM

[75] Inventor: Ted W. Giles, Montgomery, Ala.

[73] Assignee: Giles Enterprises, Inc., Montgomery, Ala.

[21] Appl. No.: 610,284

[22] Filed: Mar. 4, 1996

Related U.S. Application Data

[63] Continuation-in-part of Ser. No. 384,937, Feb. 7, 1995, abandoned.

[51] Int. Cl.[6] ............................................. B01D 35/143
[52] U.S. Cl. .................... 55/274; 55/422; 55/DIG. 36; 96/26; 96/55
[58] Field of Search .................... 55/422, 467, 274, 55/DIG. 36; 96/55–59, 26, 18, 25; 95/25, 57; 454/56, 61–64

[56] References Cited

U.S. PATENT DOCUMENTS

| | | | |
|---|---|---|---|
| 3,249,037 | 5/1966 | Stalker | 55/DIG. 36 |
| 3,660,969 | 5/1972 | Fox | 55/DIG. 36 |
| 3,954,427 | 5/1976 | Jenn | 55/DIG. 36 |
| 4,117,833 | 10/1978 | Gueller | 55/DIG. 36 |
| 4,200,087 | 4/1980 | Welsh | 55/DIG. 36 |
| 4,373,509 | 2/1983 | Neitzel et al. | 55/DIG. 36 |
| 4,475,534 | 10/1984 | Moriarty | 55/DIG. 36 |
| 4,854,949 | 8/1989 | Giles, Sr. et al. | 55/467 X |
| 4,902,316 | 2/1990 | Giles, Sr. et al. | 55/467 X |
| 5,154,161 | 10/1992 | Rogers et al. | 55/DIG. 36 |

FOREIGN PATENT DOCUMENTS

| | | | |
|---|---|---|---|
| 0314085 | 5/1989 | European Pat. Off. | 55/DIG. 36 |
| 2424079 | 12/1979 | France | 55/DIG. 36 |
| 63-209721 | 8/1988 | Japan | 96/26 |

*Primary Examiner*—Richard L. Chiesa
*Attorney, Agent, or Firm*—Jacobson, Price, Holman & Stern, PLLC

[57] ABSTRACT

An existing exhaust hood having a single coarse particulate filter for filtering contamination laden air is replaced by a filtration module preferably having two filters and optionally a third filter. The two preferred filters are a grease baffle filter and an electrostatic air cleaner (EAC). Optionally, a charcoal filter would be a third filter in a series of three filters for removing odors from exhausted air. The preexisting exhaust fan of the hood would be maintained in use and the preexisting duct work to the exterior of a building would also be maintained for exhausting the now filtered air to the exterior of the building. The filtration module would lower the amount of volatile organic compounds to an acceptable level so as to prevent pollution of the exterior environment of a building.

15 Claims, 4 Drawing Sheets

AIR FILTRATION SYSTEM FOR VENTED EXHAUST SYSTEM

This application is a continuation-in-part of application Ser. No. 08/384,937, filed on Feb. 7, 1995, now abandoned.

FIELD OF THE INVENTION

This invention relates to a filtration system which is retrofittable to a vented exhaust system by the addition of a filtration module, to clean contaminated air, including fumes produced by cooking, prior to being exhausted to the exterior of a building.

BACKGROUND OF THE INVENTION

The evolution of vented exhaust hoods has primarily been based on interior environmental concerns. Originally, vented exhaust hoods merely passed contaminated air, from a building, through a coarse particulate filter to the exterior of the building without a concern for the contamination of the exterior environment.

Exhaust fans for exhaust of contaminated air, which for some reason could not be located adjacent to an exterior of a building, required the "cleansing" of the contaminated air prior to the release of the air to the interior of the building. This situation would arise in the case of high-rise buildings where the cost of venting fumes to the atmosphere is very high, due to the cost of duct work through a tall building.

Based upon this need, U.S. Pat. No. 4,854,949 to Giles Sr. et al. discloses an apparatus for cooking food including a ventless exhaust system. According to this patent, an apparatus for cooking food, particularly for deep frying, includes a ventless air filtering apparatus located substantially above an oil container. Heated air, rising from the container during cooking, is drawn through the filter apparatus by a fan which circulates the heated, grease-laden air through the filter apparatus and then recirculates cleaned air into the room. The filter apparatus includes an aluminum filter for trapping grease and moisture, an electrostatic precipitator for removing particulates, a flame arrester for preventing passage of flames, and a charcoal filter for deodorizing the air.

In U.S. Pat. No. 4,902,316 to Giles Sr. et al., an oven including a ventless exhaust system is disclosed. In this patent, a ventless air filtering apparatus is located in a hood substantially above an oven. Fumes rising from the oven are drawn through the filter apparatus by a fan which circulates the grease and/or moisture-laden fumes through the filter apparatus, and then recirculates cleaned air into the room. The filter apparatus includes an aluminum filter for trapping and condensing grease and moisture, an electrostatic precipitator for removing particulates, and a charcoal filter for deodorizing the air. The cleaned air is pulled into a fan and recirculated into a room, such as the room in which the oven is located.

Southern California has recently mandated a reduction of emissions of volatile organic compounds (VOC) by 90%. This requirement will affect some 30,000 restaurants in the Los Angeles and Orange County areas alone. Additionally, the Environmental Protection Agency (EPA) is contemplating mandating similar restrictions. This means that eventually, all exhaust hoods will be required to exhaust air of an acceptable quality, even when exhausting to the exterior environment.

SUMMARY OF THE INVENTION

Accordingly, it is an object of the present invention to retrofit existing vented exhaust hoods or fit new exhaust hoods, that exhaust to the exterior environment of a building, with a filtration module which vastly increases the amount of filtration of air to limit the amount of contaminated air exhausted to the exterior environment. Air exhausted from a hood modified according to the present invention will have a greatly reduced amount of particulate material included in the air stream so as to limit contamination of the exterior environment.

By the present invention, a single coarse particulate filter, in an existing vented exhaust hood, is replaced by a filtration module having at least two filters, and optionally a third filter. The two preferred filters will be a grease baffle filter and an electrostatic air cleaner (EAC). The electrostatic air cleaner contemplated as being used is the electrostatic precipitator described in U.S. Pat. Nos. 4,854,949 and 4,902,316, herein incorporated by reference in their entirety. Optionally, a charcoal filter would be used as a third filter, in combination with a grease baffle filter and an electrostatic air cleaner, for removing odors from exhausted air.

The preexisting exhaust fan and exhaust duct work to the exterior of a building of the vented exhaust hood would be maintained for exhausting the now filtered air to the exterior of the building after passage through the filtration module. The filtration module would lower the amount of volatile organic compounds to an acceptable level, so as to prevent pollution of the exterior environment of a building.

Accordingly, it is another object of the present invention to retrofit an existing vented exhaust hood with a filtration module including a plurality of filters for reducing the volatile organic compound contamination of air to be exhausted to the exterior of a building.

It is yet another object of the present invention to replace a preexisting coarse particle air filter of a vented exhaust hood with a filtration module having an electrostatic air cleaner to reduce the amount of volatile organic compounds exhausted to the exterior of a building.

It is still yet another object of the present invention to retrofit an existing vented exhaust hood system with a filtration module including a series of three filters, including a grease baffle filter, an electrostatic air cleaner and a charcoal filter, so as to reduce the amount of volatile organic compounds and odors exhausted to the exterior of a building.

It is still yet another object of the present invention to retrofit an existing vented exhaust hood system with a filtration module having an outer housing with an inner housing pivotally mounted on the outer housing, with the inner housing having a plurality of filters which are slid into and out of the inner housing for maintaining an acceptable level of emissions of volatile organic compounds to the exterior environment of a building.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
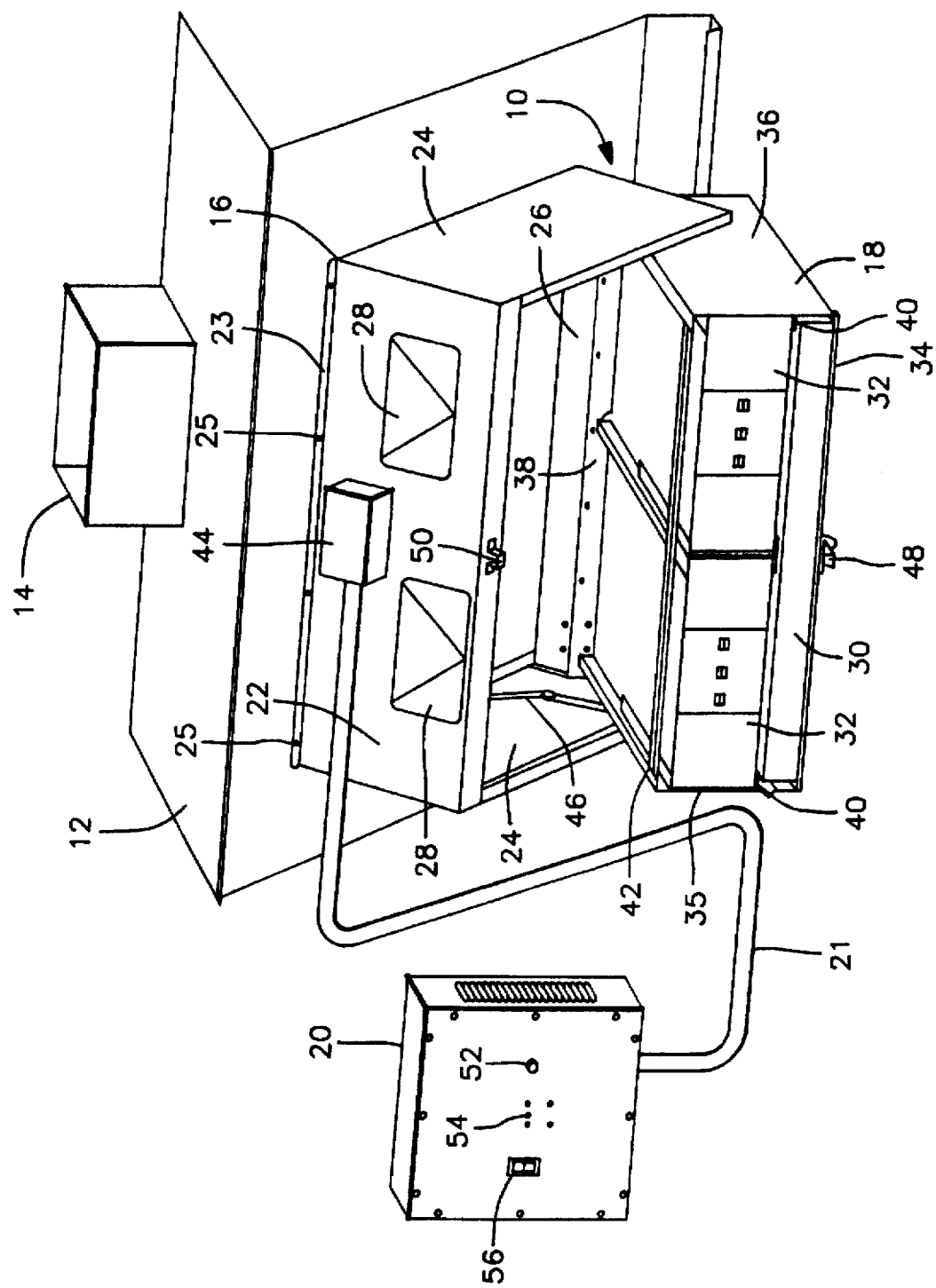
FIG. 1 is a perspective view of a vented exhaust hood system with a filtration module attached by an outer housing to the hood system and an inner housing pivoted away from the outer housing to gain access to filters within the inner housing according to the principles of the present invention.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1, in particular, a filtration module embodying the teachings of the subject invention is generally designated as 10. With reference to its orientation in FIG. 1, the filtration module is mounted in a preexisting exhaust hood 12 having an exhaust duct 14 which is in communication with the exterior of a building. The exhaust hood 12 includes an exhaust fan (not shown) as is known to cause contaminated air to enter the hood and pass through the filtration module 10 prior to being exhausted through the exhaust duct 14 to the exterior of the building. The exhausted air is thereby passed through a series of filters to remove particulate and volatile organic compound contamination.

Normally, exhaust hood 12 will only include a coarse particulate air filter for removing only the largest of air contamination particles. However, by the present invention the single coarse particulate air filter is replaced by filtration module 10.

According to the present invention, as shown in FIG. 1, the air filtration module includes an outer housing 16, an inner housing 18, and a power control module 20. The outer housing 16 has a top wall 22, side walls 24, and rear bottom wall 26. The outer housing is mounted to the existing vented exhaust hood 12 in the location previously occupied by the baffle filter.

The outer housing 16 is attached to the vented exhaust hood by a flange 23 of the top wall 22 by rivets 25 and by a flange 27 at the bottom wall 26 by rivets (not shown). The outer housing 16 also contains power contact plates 28 on the top wall 22 for connection with electrostatic air cleaners 32.

The inner housing 18, as shown in FIG. 1, contains a single baffle filter 30, two electrostatic air cleaners 32, and optionally, two charcoal filters (not shown). The inner housing 18 has a lower front wall 34, side walls 36, bottom wall 38, filter support brackets 40 and upper rear wall brace 42. The inner housing 18 is pivotally mounted along the bottom wall 38 of the inner housing 18 to the bottom wall 26 of the outer housing 16 by hinge 39.

A hinge stop bracket 46 is mounted to the side wall 36 of the inner housing 18 and to the side wall 24 of the outer housing 16 to control the opening distance of the inner housing 18. A releasable latch 48 is attached to the upper front wall 34 of the inner housing 18 and engages a latch strike 50 on the top wall 22 of the outer housing 16 when the inner housing 18 is pivoted into a closed, operating position, to secure the inner housing 18 to the outer housing 16.

Filter support brackets 40 for supporting the various layers of filters are mounted to the side walls 36, upper rear wall 42, and bottom wall 38 of the inner housing 18 for holding filters in place in the closed operating position. The brackets allow sliding entry and withdrawal of the filters when the inner housing 18 is pivoted down into a non-operating, open position away from the outer housing which is in a substantially horizontal orientation.

Figure 2:
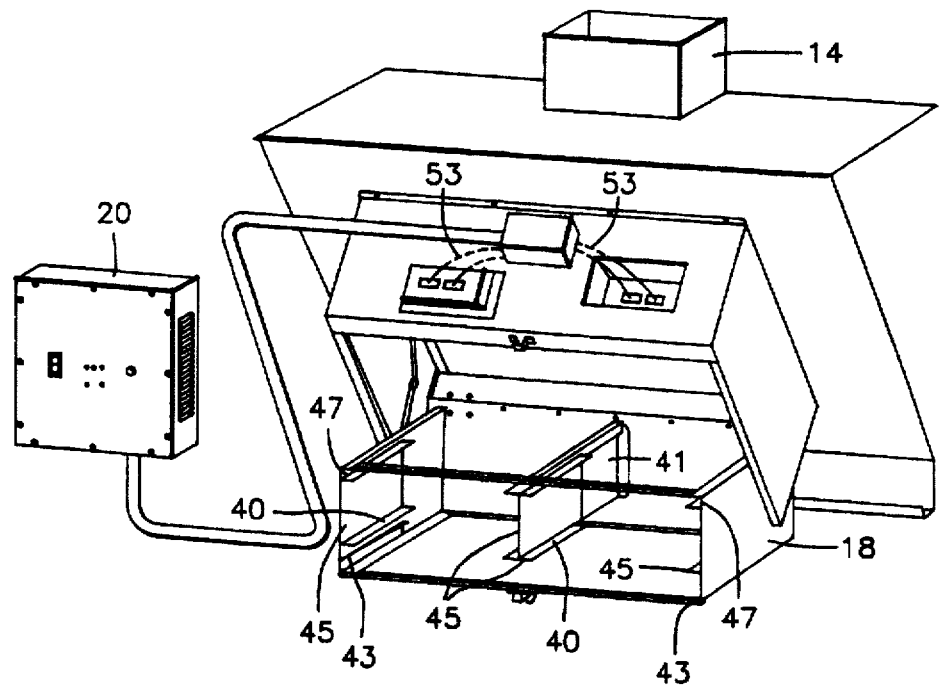
FIG. 2 is a view similar to FIG. 1 with the filtration module having its inner housing pivoted away from the outer housing to expose guide channels for receipt of a plurality of air filters according to the present invention.

In FIG. 2, the individual channel brackets 40 are shown projecting from the side walls of a central dividing plate 41 so as to form spaced compartments for receipt of various filter elements. At the lowermost portion of the inner housing 18, a filter support channel 43 is provided extending across the entire width of the inner housing 18 for supporting a baffle filter. Although a single baffle filter channel 43 is shown for receipt of baffle filter 30 as shown in FIG. 1, it is contemplated as being within scope of the present invention that the same number of baffle filter channels 43 and baffle filters could be provided as there are EAC filter channels 45 and EAC filters. In FIG. 2, there are two EAC filter channels 45 which extend between the outer side walls 36 and the dividing plate 41 of the inner housing 18. In addition, two charcoal filter channels 47 are provided above the EAC filter channels 45 for receipt of optional charcoal filters which are omitted from FIG. 1 for purposes of clarity.

A power control module 20, which is remotely mounted from the air filtration module 10 and vented exhaust hood 12, is connected to outer housing 16 by electrical wiring and conduit 21 through a junction box 44, which is mounted on the top wall 22 of the outer housing 16. The power control module 20 contains inner housing interlock indicator light 52, electrostatic air cleaner light 54, and a power switch 56.

EAC indicator light 54 is connected by wiring and conduit 21 to EAC contact switch 49 mounted on top wall 22 of the outer housing. A microswitch provides an indication by light 52 if an EAC filter 32 is properly in place when the inner housing is pivoted into position within the outer housing.

Interlock light 52 is connected by wiring and conduit 21 to inner housing interlock switch 51. Switch 51 indicates if inner housing 18 is properly secured in outer housing 16 by latch 48. An audible alarm may be sounded if operation of the vent exhaust system is attempted and switches 49 and 51 are not properly engaged. In addition, the power modules may include warning lights when the EAC needs to be cleaned and/or replaced.

The power control module 20 contains electronic components which power the electrostatic air cleaners 32 located within the air filtration module 10. Electrical wires 53 connect box 44 with the contact plates 28. When the EACs 32 are in position, the contact plates will power the EACs 32. Removable drip cup 58, as shown in FIGS. 5 and 6, attaches on the bottom wall 38 of the inner filter module housing 18.

Figure 3:
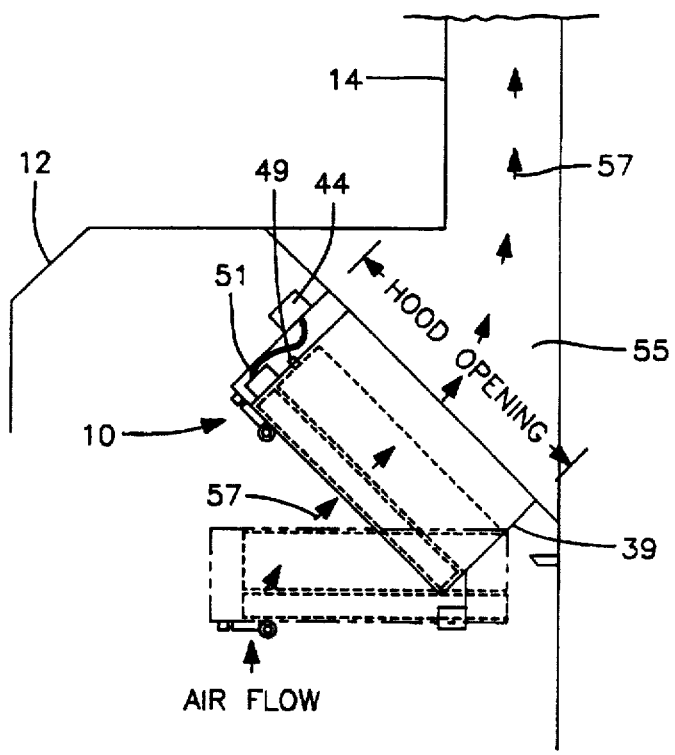
FIG. 3 is a side elevational view of a filtration module secured to an existing vented exhaust hood system with an inner housing of the filtration module shown in dotted lines being pivoted away from an outer housing of the filtration module into an open position in a substantially horizontal orientation.

As shown in FIG. 3, by the positioning of the outer housing in an existing hood 12 so as to cover the exhaust hood opening 55, airflow, as moving in the direction of arrows 57, passes through the filtration module 10 and is exhausted through duct 14 to the surrounding environment.

Figure 4:
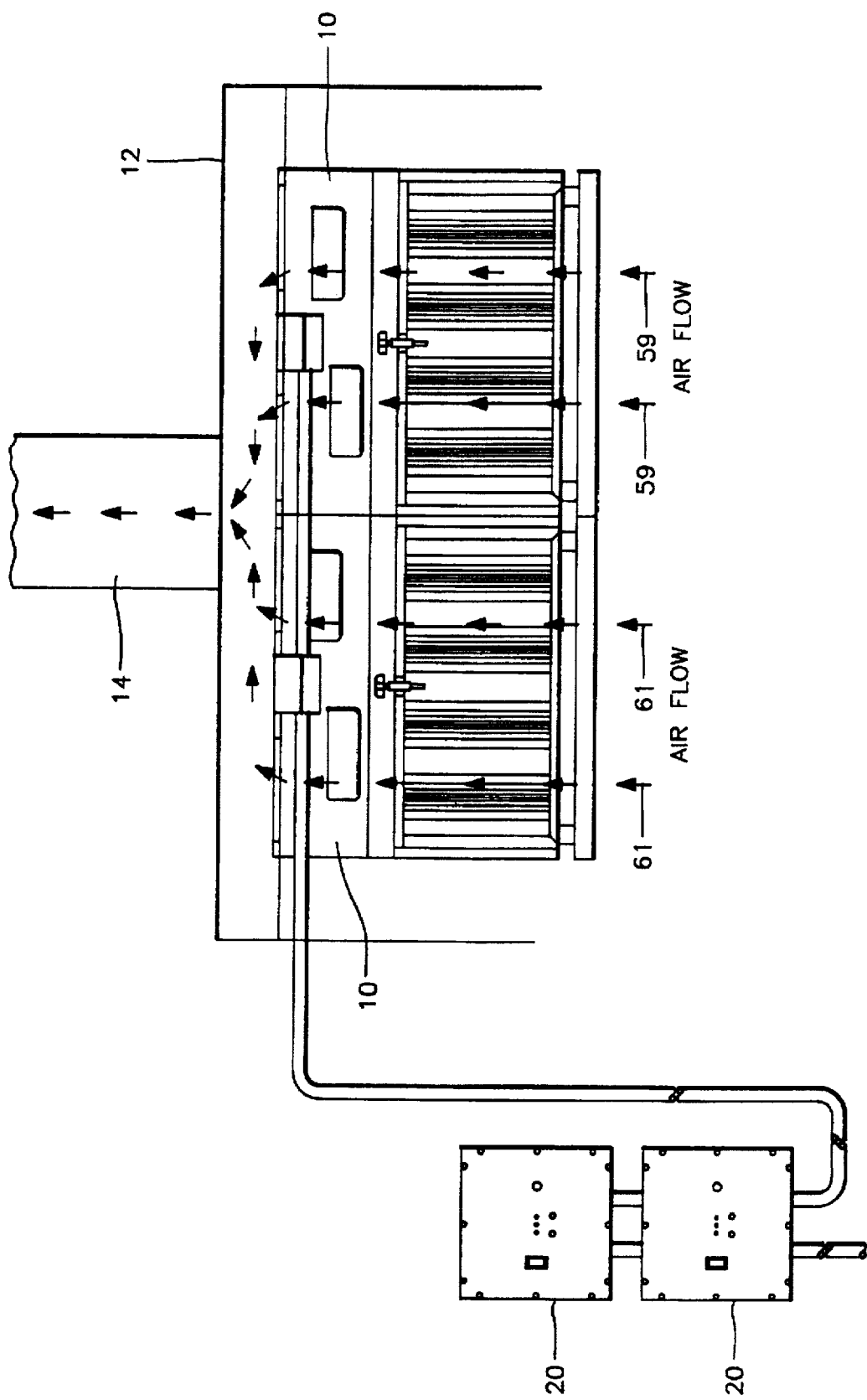
FIG. 4 is a front view of two filtration modules mounted in a vented exhaust hood system with their electronic controls mounted at a distance from the filtration modules.

As shown in FIG. 4, the number of filtration modules used is based upon the length of the existing hood 12. In FIG. 4, two filtration modules 10 are shown for directing airflow as indicated by arrows 59 through one filtration module 10, and an airflow path as indicated by arrows 61 directs airflow through the other filtration module 10 for exhausting of filtered air through duct 14. In the embodiment shown in FIG. 4, there are two power control modules 20 with one power control module associated with each filtration module 10.

Figure 5:
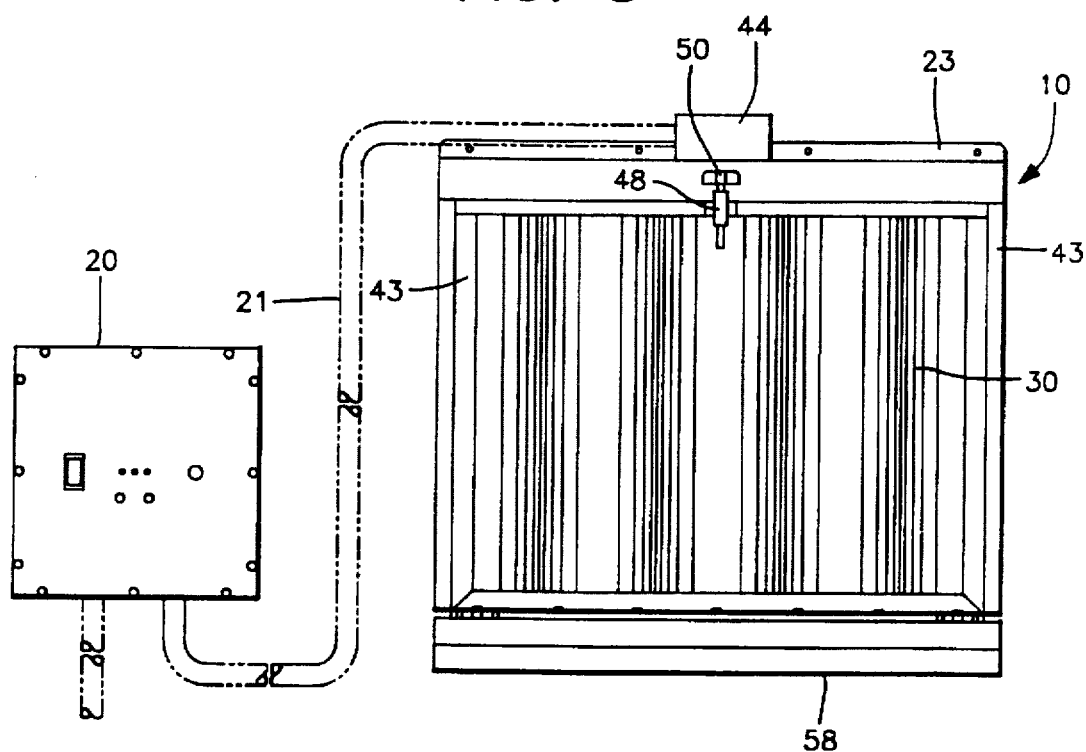
FIG. 5 is a front view of a single filtration module embodying the principles of the present invention.
Figure 6:
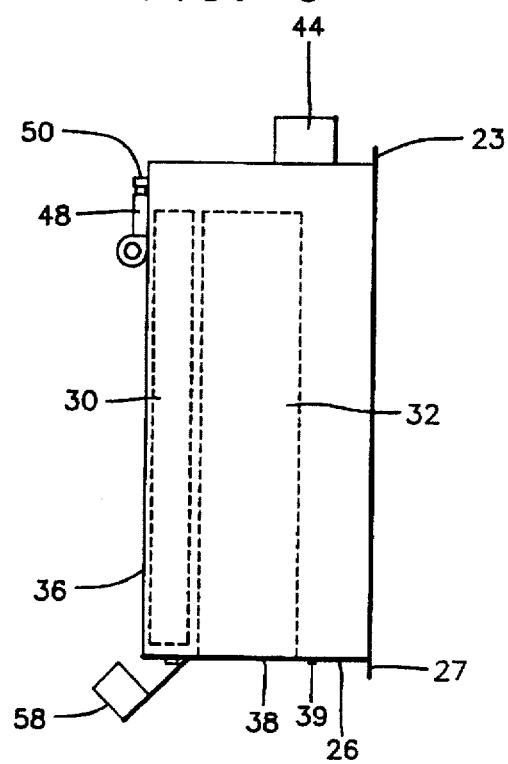
FIG. 6 is a side view of a filtration module embodying the principles of the present invention.

In FIGS. 5 and 6, the opening defined by the baffle filter channel 43 allows viewing of the baffle filter 30 from the outside of the filtration module 10. By retraction of latch 48, from the latch strike 50, the inner housing of the filtration module 10 will pivot about hinge 43 to the open position in an approximately horizontal orientation.

By securing the outer housing of the filtration module in a preexisting hood 12, the preexisting hood can be adapted to meet strict standards for required removal of volatile organic compounds. It will not be necessary to replace a preexisting hood, which would be a substantial additional expense, when it is possible, according to the present invention, to retrofit an existing hood with the filtration module and its inner and outer housings of the present invention.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. An air filtration module for removing volatile organic compounds in a vented exhaust system, said air filtration module comprising:

an outer housing, and an inner housing including channels for removably receiving at least two air filters, said inner housing being pivotably mounted on said outer housing and movable between a closed position where said inner housing is located within said outer housing and an open position where said inner housing is swung away from said outer housing, said outer housing being electrically connected to a power control module, said power control module including at least one indicator for indicating the presence or absence of at least one air filter in the channels in said inner housing.

2. An air filtration module as claimed in claim 1, where said two air filters are a baffle filter and an electrostatic air cleaner.

3. An air filtration module as claimed in claim 1, wherein said inner housing includes channels for removably receiving three air filters.

4. An air filtration module as claimed in claim 1, wherein a releasable latch allows movement of said inner housing between said closed position and said open position.

5. An air filtration module as claimed in claim 1, wherein said power control module includes an indicator for indicating the position of said inner housing in one of said open position and said closed position.

6. An air filtration module as claimed in claim 1, wherein said outer housing includes a power contact plate for engagement by an electrostatic air cleaner mounted in said inner housing when said inner housing is in said closed position.

7. An air filtration module as claimed in claim 1, wherein an interlock switch cooperates with said inner housing and said outer housing to prevent operation of the vented exhaust system when said inner housing is in other than said closed position.

8. An air filtration module for use, in combination, with a vented exhaust system, said combination comprising:

an exhaust hood having an air vent opening and a passageway in communication with said air vent opening and the atmosphere outside of a building, an air filtration module secured to said exhaust hood over said air vent opening so that air passing to said passageway through said air vent opening first passes through said air filtration module, said air filtration module including an outer housing and an inner housing pivotally mounted on said outer housing and movable between a closed position, where said inner housing is located within said outer housing, and an open position, where said inner housing is swung away from said outer housing, said inner housing including at least two air filter channels for removably receiving a baffle filter and an electrostatic air cleaner, said outer housing being electrically connected to a power control module located remote from said air filtration module, said power control module including at least one indicator for indicating the presence or absence of at least one air filter in the air filter channels in said inner housing.

9. The combination as claimed in claim 8, wherein said inner housing includes a third filter channel for a charcoal filter.

10. The combination as claimed in claim 8, wherein a releasable latch allows movement of said inner housing between said closed position and said open position.

11. The combination as claimed in claim 8, wherein said power control module includes an indicator for indicating the position of said inner housing in one of said open position and said closed position.

12. The combination as claimed in claim 8, wherein said outer housing includes a power contact plate for engagement by an electrostatic air cleaner mounted in said inner housing when said inner housing is in said closed position.

13. The combination as claimed in claim 8, wherein an interlock switch cooperates with said inner housing and said outer housing to prevent operation of the vented exhaust system when said inner housing is in other than said closed position.

14. The combination as claimed in claim 8, wherein said inner housing is located in an approximately horizontal orientation in said open position.

15. The combination as claimed in claim 8, wherein said air filter channels are formed by guide rails secured inside of said inner housing for supporting air filters in position and for defining a path of travel of said air filters into and out of said inner housing.

* * * * *